(12) United States Patent
He et al.

(10) Patent No.: US 8,079,521 B2
(45) Date of Patent: Dec. 20, 2011

(54) FRACTIONAL DOWN-SAMPLING IN IMAGING BARCODE SCANNERS

(75) Inventors: Duanfeng He, S. Setauket, NY (US); Brad Carlson, Huntington, NY (US); Mark Dryzmla, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 470 days.

(21) Appl. No.: 12/425,640

(22) Filed: Apr. 17, 2009

(65) Prior Publication Data

US 2010/0264219 A1 Oct. 21, 2010

(51) Int. Cl.
*G06K 7/10* (2006.01)
*G06K 7/14* (2006.01)

(52) U.S. Cl. .................................. 235/454; 235/462.41

(58) Field of Classification Search ................. 235/454, 235/2.07, 462.1, 462.11, 462.25, 462.32, 235/462.41, 462.07
See application file for complete search history.

(56) References Cited

U.S. PATENT DOCUMENTS

| 4,794,239 | A | 12/1988 | Allais |
| 5,304,786 | A | 4/1994 | Pavlidis et al. |
| 5,341,442 | A * | 8/1994 | Barrett ........................ 382/166 |
| 6,360,029 | B1 * | 3/2002 | Moller ........................ 382/298 |
| 6,694,059 | B1 * | 2/2004 | Zlotnick ..................... 382/228 |
| 2002/0044689 | A1 | 4/2002 | Roustaei et al. |
| 2006/0221197 | A1 * | 10/2006 | Jung et al. ................. 348/222.1 |

OTHER PUBLICATIONS

International Search Report and Written Opinion dated Jul. 23, 2010 in related case PCT/US2010/030463.

* cited by examiner

*Primary Examiner* — Michael G Lee
*Assistant Examiner* — Suezu Ellis
(74) *Attorney, Agent, or Firm* — Nong-Qiang Fan (57) ABSTRACT

A method of improving the performance of an imaging reader includes (1) illuminating a symbol by projecting illuminating light on the symbol from the imaging reader, (2) capturing return light form the symbol as pixel data over a two-dimensional field of view of a solid-state imager having a matrix of image sensors, (3) reducing the number of pixels to generate reduced pixel data, (4) transmitting the reduced pixel data to a decoding circuit.

16 Claims, 7 Drawing Sheets

FRACTIONAL DOWN-SAMPLING IN IMAGING BARCODE SCANNERS

FIELD OF THE DISCLOSURE

The present disclosure relates generally to imaging readers for reading bar code symbols.

BACKGROUND

Solid-state imaging systems or imaging readers have been used, in both handheld and hands-free modes of operation, to electro-optically read targets, such as one-dimensional bar code symbols, particularly of the Universal Product Code (UPC) type, each having a linear row of bars and spaces spaced apart along a scan direction, as well as two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of photocells or light sensors, which correspond to image elements or pixels in a two-dimensional field of view of the imager, and an imaging lens assembly for capturing return light scattered and/or reflected from the symbol being imaged, and for projecting the return light onto the sensor array to initiate capture of an image of the symbol as pixel data. The imager may be a one- or two-dimensional charge coupled device (CCD) or a complementary metal oxide semiconductor (CMOS) device and includes associated circuits for producing and processing electrical signals corresponding to a one- or two-dimensional array of the pixel data over the field of view. The imager captures the return light under the control of a controller or programmed microprocessor that is operative for processing and decoding the electrical signals into data indicative of the symbol being imaged and read. During operation, the controller selectively energizes selected sensors and, in effect, maps or draws at least one virtual scan line across the symbol, in a manner analogous to a real scan line of a moving laser reader or laser scanner also operative for electro-optically reading such symbols.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In certain design of imaging readers, high resolution solid-state imagers are used. For example, a solid-state imager can have a resolution of 1280×960 pixels or more. In certain applications, the solid-state imager may need to output images at a relatively frame rate of, for example, about 30-60 frames per second. The higher frame rate allows the imager to effectively capture images of fast-moving objects. Outputting high resolution images at high frame rated may impose large bandwidth requirement. In certain applications, it may be necessary to reduce the resolution of the output images transmitted to a decoder from the solid-state imager. The resolution of the output images can be reduced by sub-sampling the original images. For example, if one column is selected for each two columns in the original images and one row is selected for each two rows in the original images, the resolution of the output images can be reduced from the original images by a factor of 2×2. But reductions by factors of 2 or higher could pose more severe limitations than downstream image analysis software can handle. In certain applications, it is desirable to reduce the resolution of the output images from the original images by a fractional ratio, such as, by a factor of 3/2×3/2, as a compromise between higher resolution images and higher frame rates.

SUMMARY

In one aspect, the invention is directed to a method of improving the performance of an imaging reader. The method includes (1) illuminating a symbol by projecting illuminating light on the symbol from the imaging reader, (2) capturing return light form the symbol as pixel data over a two-dimensional field of view of a solid-state imager having a matrix of image sensors, (3) merging the number of pixels to generate reduced pixel data with a co-processor, (4) transmitting the reduced pixel data from the co-processor to a decoding circuit. The pixel data includes a section of a pixel matrix and the section has N rows and M columns of pixels. The reducing the number of pixels includes (a) dividing the M columns of pixels in the section of pixel matrix into multiple column groups, (b) for each given row of pixels in each column group, creating additional pixels in locations between the pre-existing pixel locations, whose values are obtained through calculations involving the values of those pixels in the given group, and (c) omitting some pixels.

Implementations of the invention can include one or more of the following advantages. The resolution of the images output from the solid-state imager can be reduced by a fractional ratio. The bandwidth requirement to the decoder circuit can be reduced.

These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
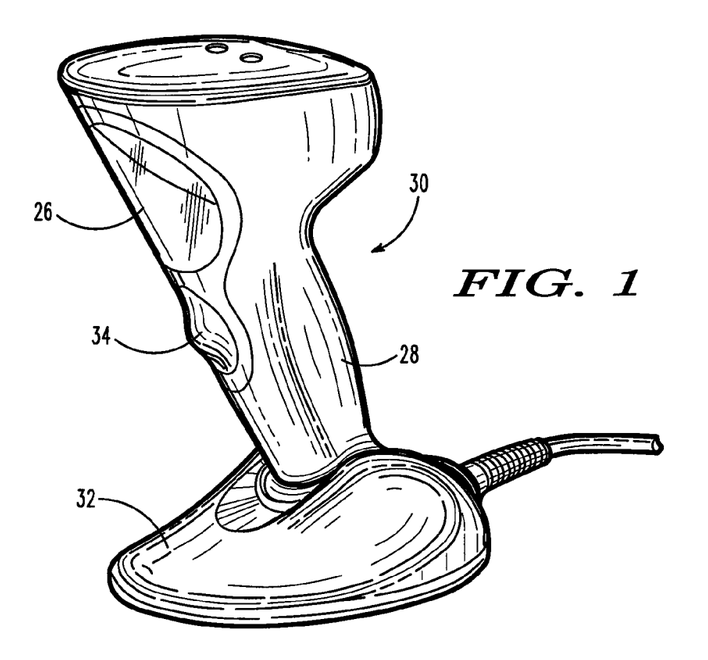
FIG. 1 generally depict an imaging reader having a generally upright window and a gun-shaped housing supported by a base.

Reference numeral 30 in FIG. 1 generally identifies an imaging reader having a generally upright window 26 and a gun-shaped housing 28 supported by a base 32 for supporting the imaging reader 30 on a countertop. The imaging reader 30 can thus be used in a hands-free mode as a stationary workstation in which products are swiped past, or presented to, the window 26, or can be picked up off the countertop and held in an operator's hand and used in a handheld mode in which the reader is moved, and a trigger 34 is manually depressed to initiate imaging of indicia, especially one- or two-dimensional symbols, to be read at a distance from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
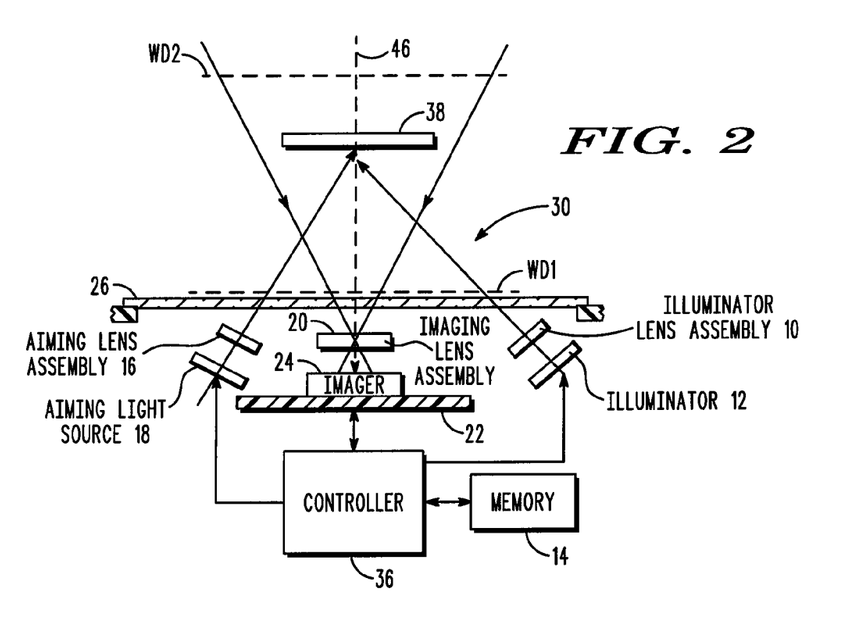
FIG. 2 generally depict that a solid-state imager is mounted on a printed circuit board in the reader.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target or symbol 38 as pixel data over a two-dimensional field of view 60. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., a light emitting diode (LED) or a laser, and an illuminating lens assembly 10 to uniformly illuminate the symbol 38 with an illuminating light having an intensity level over an illumination time period. The light source 12 is preferably pulsed.

An aiming assembly is also mounted in the imaging reader and preferably includes an aiming light source 18, e.g., an LED or a laser, and an aiming lens assembly 16 for generating a visible aiming light pattern on the symbol 38. The aiming pattern is useful to help the operator accurately aim the reader at the symbol 38.

As shown in FIG. 2, the imager 24, the illuminating light source 12 and the aiming light source 18 are operatively connected to a controller or programmed microprocessor 36 operative for controlling the operation of these components. Preferably, the microprocessor 36 includes a decoder for processing the return light from the target symbols, and for decoding the captured target images. A memory 14 is accessible by the controller 36 for storing and retrieving data.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the symbol during an exposure time period. A typical array needs about 16-33 milliseconds to transfer the date of the entire target image and operates at a frame rate of about 30-60 frames per second.

In certain applications, it is desirable to reduce the resolution of the images transferred to the decoder. FIG. 3A-3E shows that number of pixels of an image can be reduced by a fractional ratio. In FIG. 3A-3E, only a small section of pixels in an image is illustrated; that is, only pixels positioned within rows from 3m to 3m+7 and within columns from 3n to 3n+7 are illustrated.

In FIG. 3A-3E, pixels positioned within rows from 3m to 3m+3 belong to a rows group m, and the pixels positioned within rows from 3m+3 to 3m+6 belong to a rows group (m+1). The rows group m and the rows group (m+1) each have four rows of pixels. The row 3(m+1) belongs to both of these two adjacent rows groups. That is, these two adjacent rows groups share one row of pixels in common.

In FIG. 3A-3E, pixels positioned within columns from 3n to 3n+3 belong to a columns group n, and the pixels positioned within columns from 3n+3 to 3n+6 belong to a columns group (n+1). The columns group n and the columns group (n+1) each have four columns of pixels. The column 3(n+1) belongs to both of these two adjacent columns groups. That is, these two adjacent columns groups share one column of pixels in common.

Figure 3A:
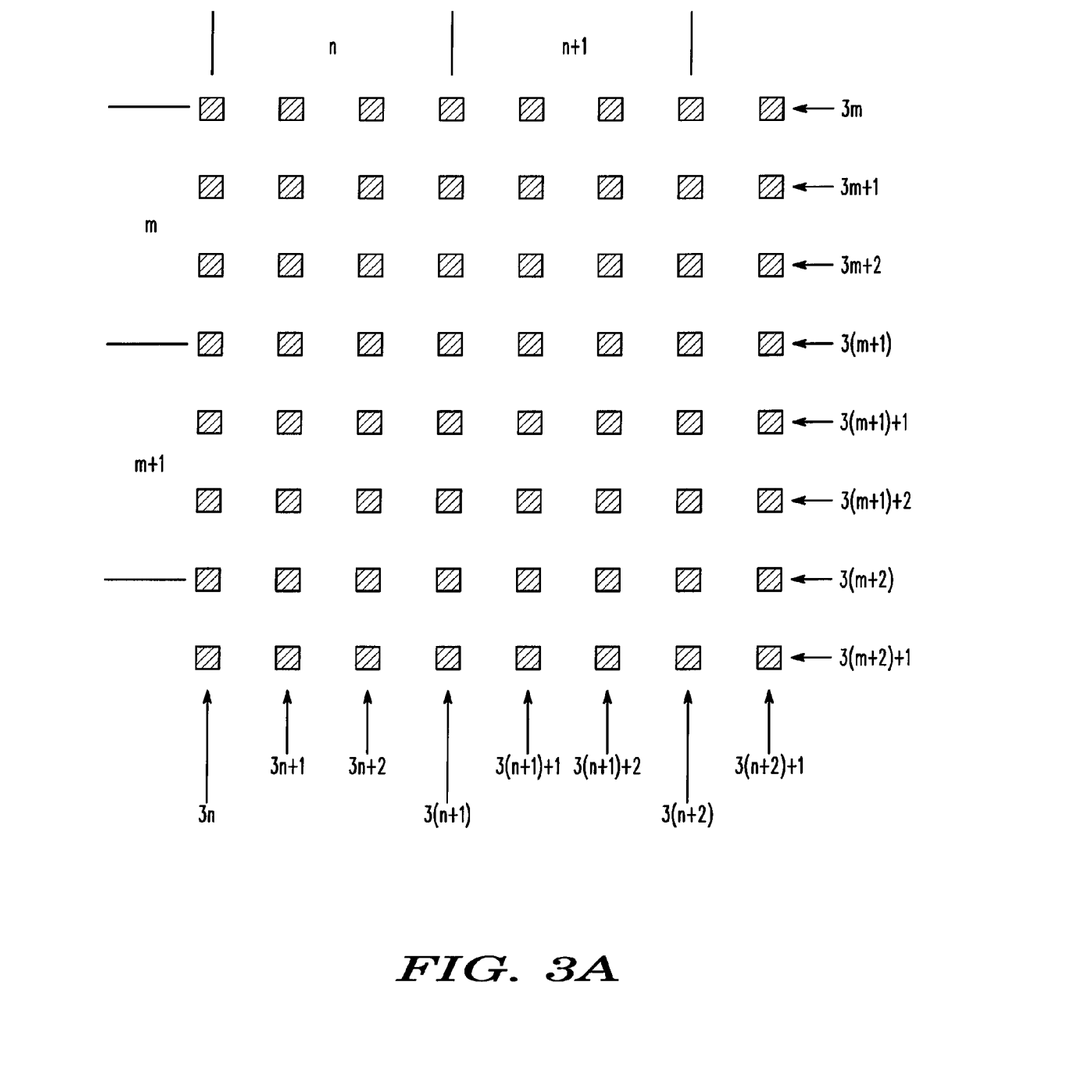
FIG. 3A-3E shows a small section of pixels in an image and illustrate that the number of pixels of an image can be reduced by a fractional ratio in accordance with some embodiments.
Figure 3B:
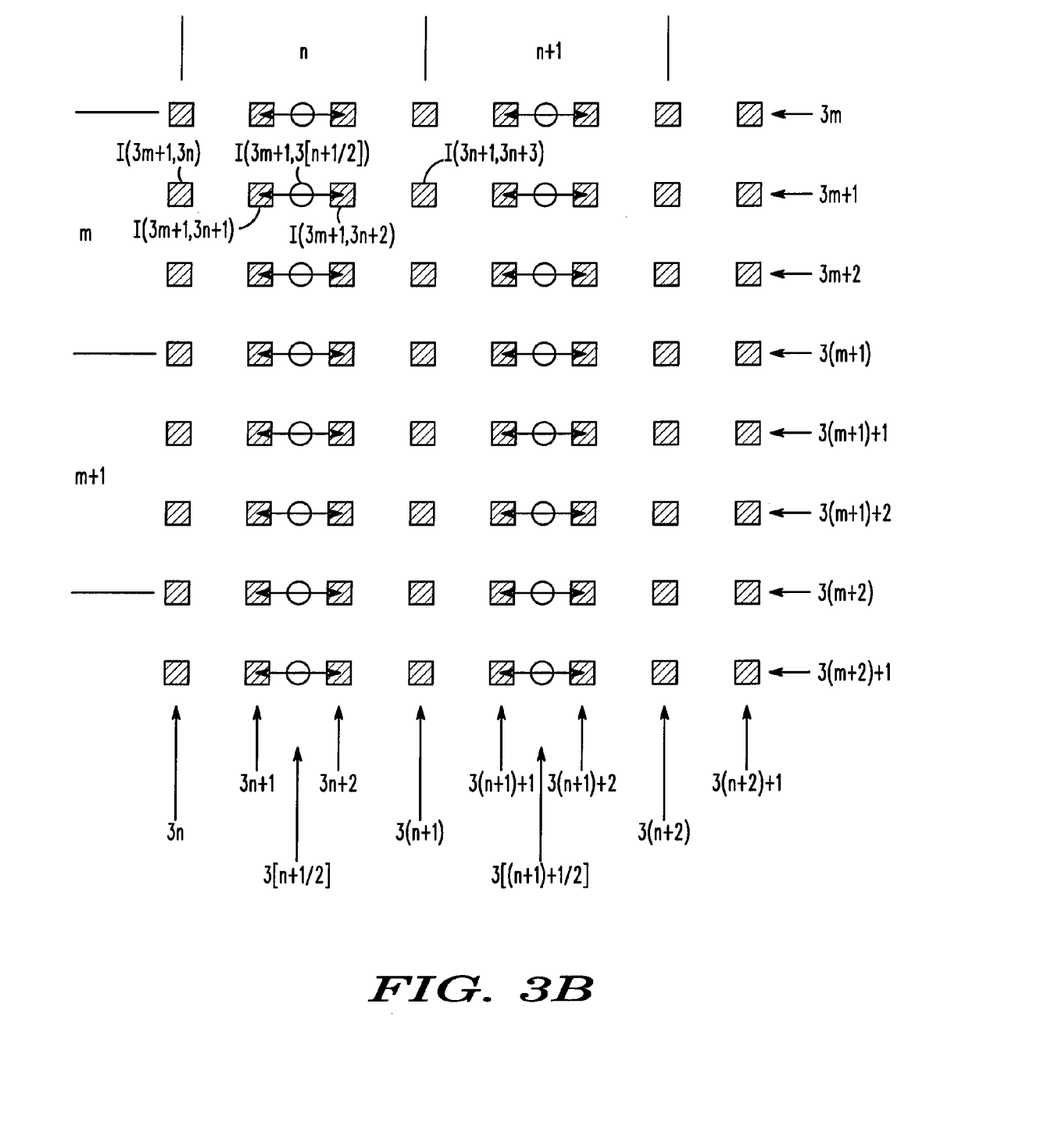

FIG. 3B shows that the two center columns in each column group can be merged into one column located at the center of the column group. For example, in the column group n, the column 3n+1 and the column 3n+2 can be merged into one column labeled as 3[n+½] located at the center of the column group n; in the column group (n+1), the column 3(n+1)+1 and the column 3(n+1)+2 can be merged into one column labeled as 3[(n+1)+½] located at the center of the column group (n+1).

Figure 3C:
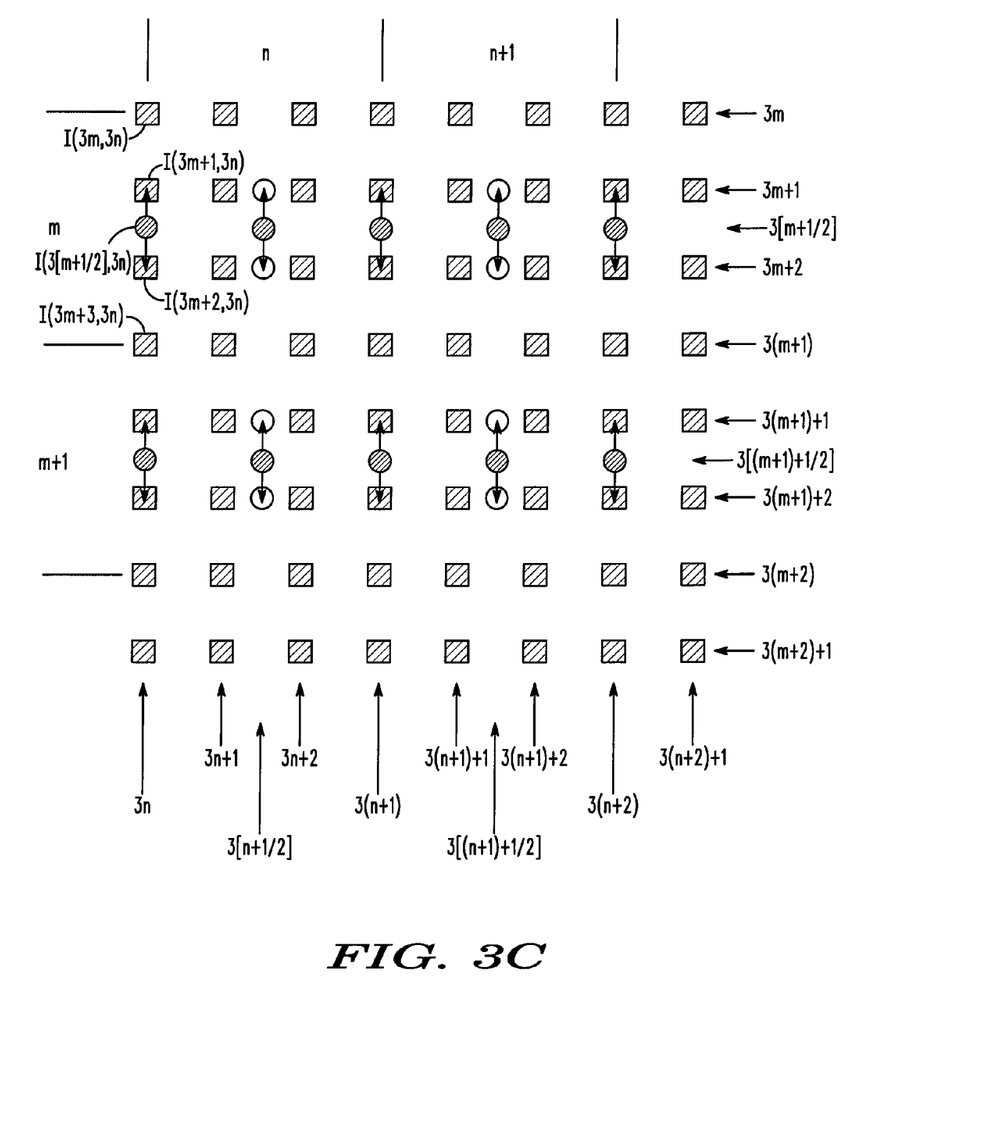

After the two center columns are merged into one column for each column group (as shown in FIG. 3B), FIG. 3C shows that the two center rows in each row group can be merged into one row located at the center of the row group as well. For example, in the row group m, the row 3m+1 and the row 3m+2 can be merged into one row labeled as 3 [m+½] located at the center of the row group m; in the row group (m+1), the row 3(m+1)+1 and the row 3(m+1)+2 can be merged into one row labeled as 3[(m+1)+½] located at the center of the row group (m+1).

Figure 3D:
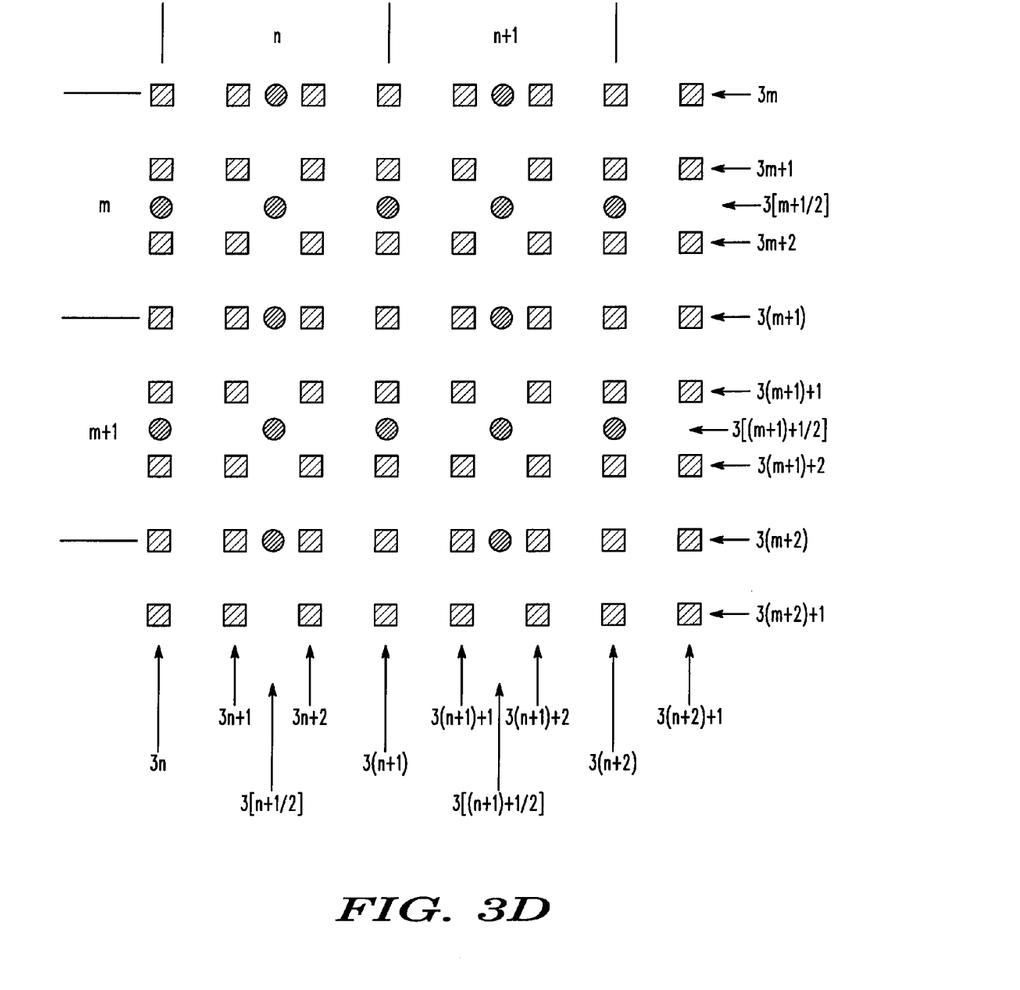

After the merging of selected columns (as shown in FIG. 3B) and the merging of selected rows (as shown in FIG. 3C), FIG. 3D shows that that the number of rows and columns in an image can be reduced. In FIG. 3D, only pixels in two types of columns are selected for output. The two types of columns are listed as follows: (1) the newly created column located at the center of each column group—e.g., column 3[n+½] or column 3[(n+1)+½]; (2) the common column shared by two adjacent columns—e.g., column 3n, column (n+1), or column (n+2). In addition, in FIG. 3D, only pixels in two types of rows are selected for output. The two types of rows are listed as follows: (1) the newly created row located at the center of each row group—e.g., row 3[m+½] or row 3[(m+1)+½]; (2) the common row shared by two adjacent rows—e.g., row 3m, row (m+1), or row (m+2).

Figure 3E:
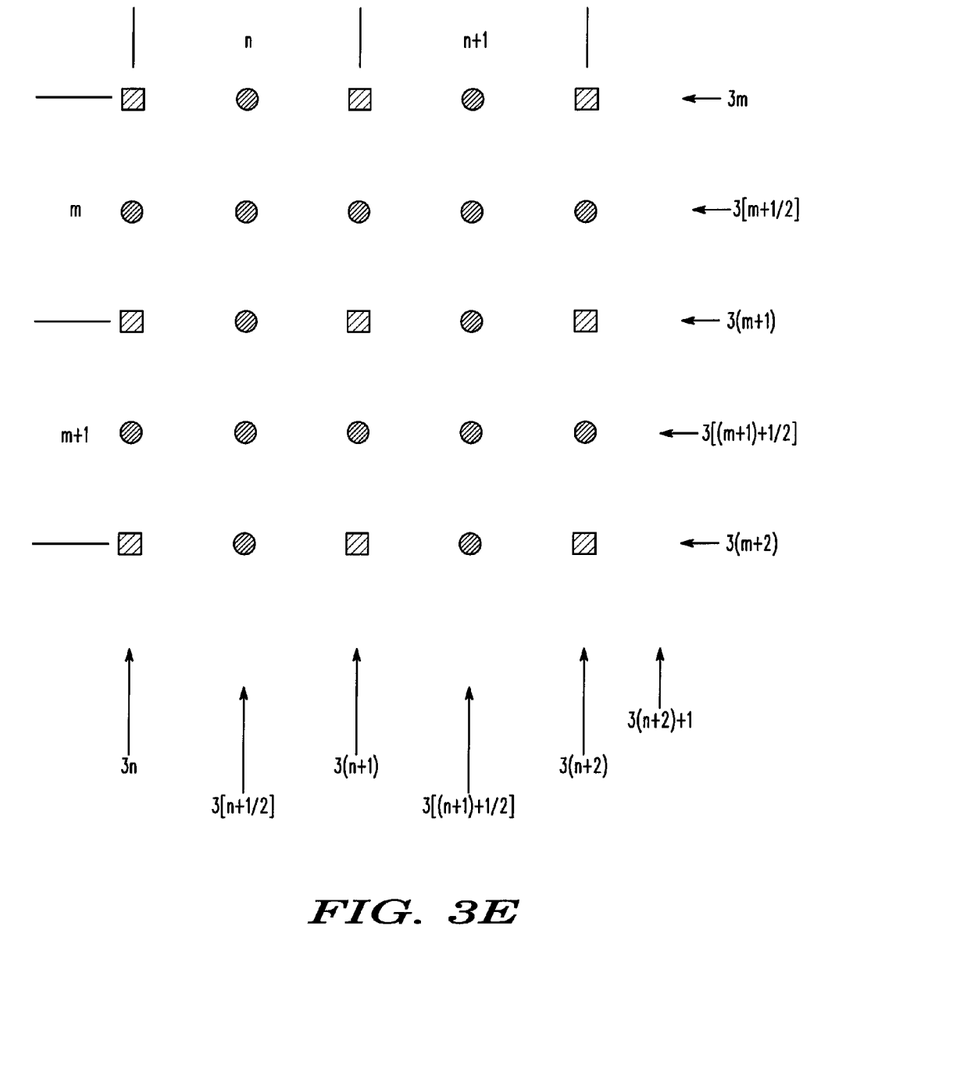

FIG. 3E shows that that the total number of pixels in an image is reduced by a fractional ratio and the reduction factor for the number of pixels is 3/2×3/2. In FIG. 3E, the columns 3n, 3n+1, 3n+2 are reduced to columns 3n and 3[n+½]; the columns 3(n+1), 3(n+1)+1, 3(n+1)+2 are reduced to columns 3(n+1) and 3[(n+1)+½]. Consequently, the total number of columns is reduced by a reduction factor of 3/2. After the number of columns is reduced, columns 3n, 3[n+½], 3(n+1), and 3[(n+1)+½] can be re-labeled respectively as columns 2n, 2n+1, 2(n+1), and 2(n+1)+1. Here, the re-labeling has take into account the reduction factor of 3/2, that is, 3n×⅔=2n, 3[n+½]×⅔=2n+1, 3(n+1)×⅔=2(n+1), and 3[n+½]×⅔=2n+1. Similarly, in FIG. 3E, the total number of rows is also reduced by a reduction factor of 3/2. In addition, rows 3m, 3[m+½], 3(m+1), and 3[(m+1)+½] can be re-labeled respectively as rows 2m, 2m+1, 2(m+1), and 2(m+1)+1.

In FIG. 3B, when the two center columns in a column group (e.g., column group n) are merged, the two center pixels in each given row is merged into one pixel. For example, in column group n, for the given row 3m+1, the two center pixels are pixels I(3m+1, 3n+1) and pixel I(3m+1, 3n+2). These two center pixels are merged into one pixel I(3m+1, 3[n+½]). The grey value of the merged pixel I(3m+1, 3[n+½]) can be determined by the grey value of other pixels in the given row 3m+1. Assume that the grey value of the pixels are denoted by a=I(3m+1, 3n), b=I(3m+1, 3n+1), c=I(3m+1, 3n+2) and d=I(3m+1, 3n+3), the grey value of the merged pixel can generally take the function form, I(3m+1, 3[n+½])=f(b,c) or I(3m+1, 3[n+½])=f(a,b,c,d). For example, with linear interpolation, the grey value of the merged pixel is $I(3m+1, 3[n+½])=(b+c)/2$.

With cubic interpolation, the grey value of the merged pixel is $I(3m+1, 3[n+½])=(9a+9d-b-c)/16$.

With an interpolation having de-blur effect built in, $I(3m+1, 3[n+½])=(5a+5d-b-c)/8$.

Based upon above teaching, people skilled in the art can also find other forms of function f(b, c) or function f(a, b, c, d).

In FIG. 3C, when the two center rows in a row group (e.g., row group m) is merged, the two center pixels in each given column is merged into one pixel. For example, in row group m, for the given column 3n, the two center pixels are pixels I(3m+1, 3n) and pixel I(3m+2, 3n), and these two center pixels are merged into one pixel I(3[m+½], 3n). For the given column 3[n+½], the two center pixels are pixels I(3m+1, 3[n+½]) and pixel I(3m+2, 3[n+½]), and these two center pixels are merged into one pixel I(3[m+½], 3[n+½]). The grey value of the merged pixel I(3[m+½], 3n) can be determined by the grey value of other pixels in the given column 3n. Similarly, the grey value of the merged pixel I(3[m+½], 3[n+½]) can be determined by the grey value of other pixels in the given column 3[n+½].

Figure 4:
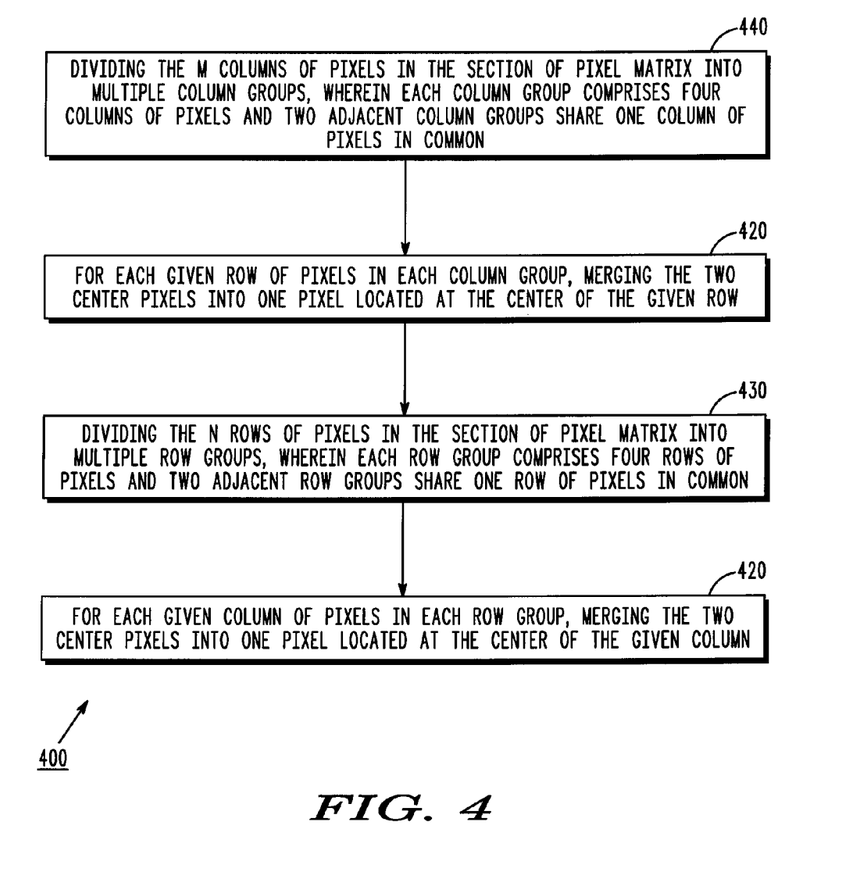
FIG. 4 shows a method 400 of reducing the number of pixels in a section a section of pixel matrix.

FIG. 4 shows a method 400 of reducing the number of pixels in a section of a pixel matrix. The method 400 includes blocks 410, 420, 430, and 440. Block 410 includes dividing the columns of pixels in the section of pixel matrix into multiple column groups. Two adjacent column groups share one column of pixels in common and each column group comprises four columns of pixels. For example, column group n and column group n+1 are shown in FIGS. 3A-3E. Column group n includes four columns 3n, 3n+1, 3n+2, and 3(n+1). The column of pixels 3(n+1) belongs to both column group n and column group n+1.

Block 420 includes merging the two center pixels into one pixel located at the center of a given row for each given row of pixels in each column group. For example, as shown in FIG. 3B, in row 3m+1 for column group n, the two center pixels are pixel I(3m+1, 3n+1) and I(3m+1, 3n+2), these two pixels are merged into one pixel I(3m+1, 3[n+½]). The grey value of the merged pixel I(3m+1, 3[n+½]) can be determined based on an interpolation of the grey values of other pixels in the row 3m+1 in column group n. Such interpolation can be linear interpolation, cubic interpolation, or other kinds of interpolation. The interpolation can also have de-blur effect.

Block 430 includes dividing the rows of pixels in the section of a pixel matrix into multiple row groups. For example, two of the multiple row groups are shown in FIGS. 3A-3E, that is, row group m and row group m+1 are shown in the figures.

Block 440 includes merging the two center pixels into one pixel located at the center of a given column for each given column of pixels in each row group. For example, as shown in FIG. 3C, in column 3n for row group m, the two center pixels are pixel I(3m+1, 3n) and I(3m+2, 3n), and these two pixels are merged into one pixel I(3[m+½], 3n).

The method 400 can advantageously be performed in a co-processor, so that the bandwidth required for the main processor is reduced. In some embodiments, the co-processor can be implemented with FPGA or ASIC. The co-processor can receive part of the pixel data or all of the pixel data from the solid state imager. In one implementation, before two columns in a column group are to be merged, the co-processor can store the grey value of the pixels in these two columns. After the co-processor calculates the grey values of the merged pixels, the co-processor can out put the grey values of the selected pixels to the decoder.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of improving the performance of an imaging reader comprising:
   illuminating a symbol by projecting illuminating light on the symbol from the imaging reader;
   capturing return light form the symbol as pixel data over a two-dimensional field of view of a solid-state imager having a matrix of image sensors, wherein the pixel data comprises a section of a pixel matrix and the section has N rows and M columns of pixels;
   merging a number of pixels to generate reduced pixel data with a coprocessor;
   transmitting the reduced pixel data from the coprocessor to a decoding circuit; and
   wherein the merging a number of pixels comprises the steps of,
   (a) dividing the M columns of pixels in the section of pixel matrix into multiple column groups, wherein two adjacent column groups share one or more columns of pixels in common,
   (b) for each given row of pixels in each column group, creating additional pixels in locations between the pre-existing pixel locations, whose values are obtained through calculations involving the values of those pixels in the given group, and
   (c) omitting some pixels.

2. The method of claim 1, wherein each column group comprises four columns of pixels.

3. The method of claim 1, wherein each column group comprises five columns of pixels.

4. The method of claim 1, wherein each column group comprises four columns of pixels and wherein two adjacent column groups share one column of pixels in common.

5. The method of claim 4, wherein the creating additional pixels in locations between the pre-existing pixel locations comprises:
   merging the two center pixels into one pixel located at the center of the given row.

6. The method of claim 4, wherein the merging the two center pixels into one pixel located at the center of the given row comprises:
   determining a grey value of the one pixel located at the center of the given row based on an interpolation of the grey values of the pixels of the two center pixels in the given row.

7. The method of claim 4, wherein the merging the two center pixels into one pixel located at the center of the given row comprises:
   determining a grey value of the one pixel located at the center of the given row based on a linear interpolation of the grey values of the two center pixels in the given row.

8. The method of claim 4, wherein the merging the two center pixels into one pixel located at the center of the given row comprises:
   determining a grey value of the one pixel located at the center of the given row based on an interpolation of the grey values of the four pixels in the given row.

9. The method of claim 4, wherein the merging the two center pixels into one pixel located at the center of the given row comprises:
   determining a grey value of the one pixel located at the center of the given row based on a cubic interpolation of the grey values of the four pixels in the given row.

10. The method of claim 4, wherein the merging the two center pixels into one pixel located at the center of the given row comprises:
    determining a grey value of the one pixel located at the center of the given row based on an interpolation of the grey values of other pixels in the given row, wherein the interpolation also includes de-blur effect.

11. The method of claim 1, wherein:
    the number of pixels in the section of pixel matrix is less than the number of the image sensors in the matrix of image sensors.

12. The method of claim 1, wherein:
    the number of pixels in the section of pixel matrix is equal to the number of the image sensors in the matrix of image sensors.

13. The method of claim 1, wherein the transmitting the reduced pixel data to a decoding circuit comprises:
transmitting the reduced pixel data to a decoding circuit in the imaging reader.

14. A method of improving the performance of an imaging reader comprising:
illuminating a symbol by projecting illuminating light on the symbol from the imaging reader;
capturing return light form the symbol as pixel data over a two-dimensional field of view of a solid-state imager having a matrix of image sensors, wherein the pixel data comprises a section of a pixel matrix and the section has N rows and M columns of pixels;
merging a number of pixels to generate reduced pixel data with a co-processor;
transmitting the reduced pixel data from the co-processor to a decoding circuit; and
wherein the merging a number of pixels comprises,
(a) dividing the M columns of pixels in the section of pixel matrix into multiple column groups, wherein two adjacent column groups share one column of pixels in common and each column group comprises four columns of pixels,
(b) for each given row of pixels in each column group, merging the two center pixels into one pixel located at the center of the given row,
(c) dividing the N rows of pixels in the section of pixel matrix into multiple row groups, wherein two adjacent row groups share one row of pixels in common and each row group comprises four row of pixels, and
(d) for each given column of pixels in each row group, merging the two center pixels into one pixel located at the center of the given column.

15. An apparatus for reading a symbol comprising:
a housing;
a solid-state imager supported by the housing and having an array of image sensors for capturing return light from the symbol as pixel data over a two-dimensional field of view;
a co-processor receiving the pixel data from the solid-state imager and operative to generate reduced pixel data from the received pixel data by merging a number of pixels in a section of a pixel matrix and the section has N rows and M columns of pixels;
a decoding circuit operative to receive the reduced pixel data from the co-processor operative to decode the reduced pixel data to derive coded information in the symbol; and
wherein the co-processor is operative to:
(a) divide the M columns of pixels in the section of pixel matrix into multiple column groups, wherein two adjacent column groups share one or more columns of pixels in common,
(b) for each given row of pixels in each column group, create additional pixels in locations between the pre-existing pixel locations, whose values are obtained through calculations involving the values of those pixels in the given group, and
(c) omit some pixels.

16. An apparatus for reading a symbol comprising:
a housing;
a solid-state imager supported by the housing and having an array of image sensors for capturing return light from the symbol as pixel data over a two-dimensional field of view;
a co-processor receiving the pixel data from the solid-state imager and operative to generate reduced pixel data from the received pixel data by merging a number of pixels in a section of a pixel matrix and the section has N rows and M columns of pixels;
a decoding circuit operative to receive the reduced pixel data from the co-processor operative to decode the reduced pixel data to derive coded information in the symbol; and
wherein the co-processor is operative to:
(a) divide the M columns of pixels in the section of pixel matrix into multiple column groups, wherein two adjacent column groups share One or more columns of pixels in common,
(b) for each given row of pixels in each column group, create additional pixels in locations between the pre-existing pixel locations, whose values are obtained through calculations involving the values of those pixels in the given group,
(c) divide the N rows of pixels in the section of pixel matrix into multiple row groups, wherein two adjacent row groups share one or more rows of pixels in common, and
(d) for each given column of pixels in each row group, create additional pixels in locations between the pre-existing pixel locations, whose values are obtained through calculations involving the values of those pixels in the given group.

* * * * *

UNITED STATES PATENT AND TRADEMARK OFFICE
CERTIFICATE OF CORRECTION

PATENT NO.       : 8,079,521 B2
APPLICATION NO.  : 12/425640
DATED            : December 20, 2011
INVENTOR(S)      : He et al.

It is certified that error appears in the above-identified patent and that said Letters Patent is hereby corrected as shown below:

On the Title Page, in item (75), under "Inventors", Line 3, delete "Dryzmla," and insert -- Drzymala, --, therefor.

In Column 10, Line 30, in Claim 16, delete "One" and insert -- one --, therefor.

Signed and Sealed this
Twenty-fifth Day of December, 2012

David J. Kappos
*Director of the United States Patent and Trademark Office*